US008224506B2

(12) United States Patent
Constans (10) Patent No.: US 8,224,506 B2
(45) Date of Patent: Jul. 17, 2012

(54) METHOD AND DEVICE FOR DETERMINING A MAXIMUM STABILIZATION HEIGHT IN THE FINAL FLIGHT PHASE OF AN AIRPLANE

(75) Inventor: Florian Constans, Riedisheim (FR)

(73) Assignee: Airbus Operations SAS, Toulouse (FR)

( * ) Notice: Subject to any disclaimer, the term of this patent is extended or adjusted under 35 U.S.C. 154(b) by 1300 days.

(21) Appl. No.: 12/021,252

(22) Filed: Jan. 28, 2008

(65) Prior Publication Data

US 2008/0249674 A1    Oct. 9, 2008

(30) Foreign Application Priority Data

Jan. 26, 2007   (FR) ...................................... 07 52895

(51) Int. Cl.
G06F 7/70 (2006.01)
G01C 19/00 (2006.01)
(52) U.S. Cl. .......................................... 701/14; 33/328
(58) Field of Classification Search .................... 701/14; 33/328
See application file for complete search history.

(56) References Cited

U.S. PATENT DOCUMENTS

| 3,797,308 | A | * | 3/1974 | Crane ........................... 73/178 T |
| 4,316,252 | A | * | 2/1982 | Cooper ........................... 701/16 |
| 4,319,219 | A |   | 3/1982 | Rein-Weston |
| 5,142,478 | A | * | 8/1992 | Crook ............................. 701/16 |
| 5,220,322 | A | * | 6/1993 | Bateman et al. ............... 340/970 |
| 5,499,025 | A | * | 3/1996 | Middleton et al. ............. 340/959 |
| 5,839,080 | A | * | 11/1998 | Muller et al. ..................... 701/9 |
| 6,092,009 | A | * | 7/2000 | Glover ............................. 701/14 |
| 6,311,108 | B1 | * | 10/2001 | Ammar et al. ................... 701/16 |
| 6,438,469 | B1 | * | 8/2002 | Dwyer et al. ..................... 701/16 |
| 6,477,449 | B1 | * | 11/2002 | Conner et al. ..................... 701/4 |
| 6,600,977 | B2 | * | 7/2003 | Johnson et al. ................. 701/17 |
| 6,718,236 | B1 | * | 4/2004 | Hammer et al. .................. 701/3 |
| 6,999,265 | B1 | * | 2/2006 | Schreck et al. .................. 360/75 |
| 7,068,187 | B2 | * | 6/2006 | Ishihara et al. ............... 340/951 |
| 7,389,163 | B1 | * | 6/2008 | Colich ............................... 701/8 |

(Continued)

FOREIGN PATENT DOCUMENTS

FR    2885439 A    11/2006

OTHER PUBLICATIONS

Constans, "Go around decision aid system in approach phase", Aug. 29, 2007, XP002448735, URL: <http://www.cert.fr/tis/theses/jthese_06/resources/presentations/ConstansF.ppt>, 18 pages.

(Continued)

Primary Examiner — James P Trammell
Assistant Examiner — Majdi Alsomiri
(74) Attorney, Agent, or Firm — Perman & Green, LLP (57) ABSTRACT

A method of determining and utilizing a maximum stabilization height of a moving airplane includes: determining a nominal total height at any point of the nominal path of the airplane, determining a total height of the airplane, determining a nominal maximum total height that the airplane is able to reach from its current position corresponding to a nominal total height and according to an optimum total height variation law, determining the maximum stabilization height corresponding to the nominal maximum total height that the airplane is able to reach, and determining whether to continue or to interrupt a landing procedure during the final flight phase of the airplane based on the determined maximum stabilization height.

20 Claims, 1 Drawing Sheet

U.S. PATENT DOCUMENTS

| | | | |
|---|---|---|---|
| 7,479,925 B2 * | 1/2009 | Schell | 342/455 |
| 7,634,353 B2 * | 12/2009 | Meunier et al. | 701/120 |
| 7,636,619 B2 * | 12/2009 | Winkler et al. | 701/14 |
| 7,636,635 B2 * | 12/2009 | Winkler et al. | 701/300 |
| 7,676,304 B2 * | 3/2010 | Colich | 701/8 |
| 7,797,086 B2 * | 9/2010 | Lorido et al. | 701/16 |
| 7,890,248 B2 * | 2/2011 | Poe et al. | 701/120 |
| 2001/0052562 A1 | 12/2001 | Ishihara et al. | |
| 2004/0030465 A1 * | 2/2004 | Conner et al. | 701/16 |
| 2004/0075586 A1 | 4/2004 | Glover | |
| 2005/0128129 A1 * | 6/2005 | Conner et al. | 342/36 |
| 2005/0151681 A1 * | 7/2005 | Conner et al. | 342/36 |
| 2005/0192738 A1 * | 9/2005 | Conner et al. | 701/120 |
| 2005/0192739 A1 * | 9/2005 | Conner et al. | 701/120 |
| 2006/0025901 A1 * | 2/2006 | Demortier et al. | 701/16 |
| 2007/0145191 A1 * | 6/2007 | Smith et al. | 244/136 |
| 2007/0219705 A1 * | 9/2007 | Bitar et al. | 701/200 |

OTHER PUBLICATIONS

Constans, "Systeme d'aide a la decision de remise des gaz pour l'equipage d'un avion civil de transport", XP002448738, Aug. 29, 2007, URL: http://www.cert.fr/tis/theses/jthese_06/resources/articles/ConstansF.pdf.

"4.2-Energy Management" Flight Safety Foundation-ALAR Approach and Landing Accident Reducaiton Tool Kit, [online] Aug. 2000-Nov. 2000, pp. 75-80, XP002448734, URL:flightsafety.org/alar/alar_bn4-2-energymgmt.pdf.

* cited by examiner

METHOD AND DEVICE FOR DETERMINING A MAXIMUM STABILIZATION HEIGHT IN THE FINAL FLIGHT PHASE OF AN AIRPLANE

CROSS-REFERENCE TO RELATED APPLICATIONS

This application claims priority to and the benefit of French Application No. 07 52895 filed on 26 Jan. 2007, the disclosure of which is incorporated by reference in its entirety.

The aspects of the disclosed embodiments relate to the field of assisting in the piloting of an airplane. More particularly, the aspects of the disclosed embodiments relate to a method and a device for improving the piloting quality and the safety of the airplane during the final phase of a flight with a view to a landing by providing the pilots with information specifically to enable them to decide whether to continue or to interrupt a landing procedure when it can be predicted that particular conditions will not be met before reaching a regulatory decision point.

BACKGROUND

The final phase of the flight of an airplane is normally broken down into an approach phase, a leveling-off phase ending with an impact on the ground and a taxiing phase of the airplane on the runway.

The quality of the approach phase is essential for the leveling-off procedure, the airplane needing to begin the latter with exact position, speed and attitude parameters.

The approach phase is therefore an important phase of the flight which largely determines the safety of the landing. In final approach, the pilots have conventional instrumental airplane information: the speeds, the height, the gradient of the airplane, alignment deviations relative to the axis of the runway (loc) and to the descent (glide) plane, the engine speed, and so on, which enable them to control the flight of the airplane.

From this instrumental information, the pilots, either in a manual or semi-automatic piloting mode, or in an automatic piloting mode monitoring function, try their best to reduce the deviations of the various flight parameters so that they achieve in a stable manner the values defined by the approach procedure. The instrumental information is also complemented by the visual perceptions of the environment which enable the pilots to assess their position relative to the approach plane.

A major proportion of the incidents or accidents involving airplanes occurs in final phases, such as, for example, tail-strikes, hard landings and longitudinal or lateral departures from the runway. One of the main causes of these incidents is associated with the fact that flight parameters of the airplane could not be correctly stabilized in the approach phase, and in particular when an airplane is too high or at too high a speed in its approach.

In most cases, if the pilots of the airplane, who have a high workload during this flight phase, had had a better awareness that the actual situation of their airplane would not have enabled them to achieve a landing in good conditions, the accidents could have been avoided by a go-around and a new approach in good conditions.

The US patent published under the number U.S. Pat. No. 7,068,187 proposes a method for assisting the pilots of an airplane in a go-around decision. Many parameters, such as, for example, the wind conditions on the runway, the speed of the airplane or the gradient of the airplane, are monitored during the approach phase, in order to detect the conditions of a non-stabilized approach, and a risk level is assessed. When the risk exceeds a certain threshold, an alarm is generated to warn the pilots of a need for a go-around.

However, the method described in this patent does not enable the pilots to know which parameters are forcing them to perform a go-around. This lack of knowledge of the reasons forcing the pilots to perform a go-around can induce among them a certain reluctance to execute a maneuver for which they do not know the motivation, particularly because of other possible criteria of choice which could be deemed more important by the pilots.

The French patent published under the number 2885439 proposes a method to assist in the piloting of an airplane in an approach phase with a view to a landing. More particularly, the method provides help in managing the energy in the approach phase, to assist the pilots in their decision whether or not to interrupt the approach phase with a go-around maneuver.

This method enables the pilots to check, before beginning the final approach phase, that they can reach the runway. However, in the final approach phase, the information concerning the closest point of contact with the ground is no longer relevant for the piloting. The pilots could, in practice, consider that they are able to reach the runway and therefore be urged unwittingly to continue an approach although said approach is not stabilized.

SUMMARY

There is therefore an interest in informing the pilots as early as possible of conditions that would not enable them to perform a landing in stabilized approach conditions, and this from a regulatory height.

The disclosed embodiments propose a device and a method for determining a maximum stabilization height $h_{stab}$ in the final phase of a flight of an airplane, with a view to a display to assist the pilot in taking an appropriate decision and thus improve the quality of the piloting and the safety of the airplane.

According to the disclosed embodiments, the method of determining a maximum stabilization height $h_{stab}$ of an airplane moving from a position, called current position, at a height $h_{av}$ relative to a reference point and with a speed $V_{av}$ in a final flight phase of said airplane, said final flight phase comprising a nominal approach path roughly in a vertical plane passing through an axis X of a runway and determined by:

nominal height values according to the position along the axis X called height law $h_{nom}(X)$ relative to the reference point;

nominal approach speed values according to the position along the axis X called speed law $V_{nom}(X)$;

comprises:

a) a step for determining a nominal total height HTnom at any point of the nominal path by the relation $$H_{Tnom}(X) = h_{nom}(X) + \frac{(V_{nom}^2(X))}{2g}$$

in which g represents the earth's gravity field;

b) a step for determining a total height of the airplane HTav by the relation $$H_{Tav} = h_{av} + \frac{V_{av}^2}{2g}$$

c) a step for determining a nominal maximum total height that the airplane is able to reach from its current position corresponding to a nominal total height and according to an optimum total height variation law $$\frac{dH_{Tav}}{dX};$$

and d) a step for determining the nominal height hstab corresponding to the nominal maximum total height that the airplane is able to reach.

In one embodiment of the method, the total height of the airplane $H_{Tav}$ is greater than the nominal total height $H_{Tnom}$(X) for the current value X of the airplane. The optimum total height variation law $$\frac{dH_{Tav}}{dX}$$

corresponds, in this case, to the total height variation law of the airplane when the engines are set to obtain a thrust roughly equal to the minimum thrust at the flight point concerned.

During the final flight phase, the nominal approach speed $V_{nom}(X)$ can be considered constant.

Similarly, the optimum total height variation law $$\frac{dH_{Tav}}{dX}$$

can be considered constant in the final flight phase.

Thus, taking account of these simplifying assumptions, the stabilization height $h_{stab}$ is determined by a linear relation:

$$h_{stab} = h_{thd} + \left(h_{av} + \frac{V_{av}^2}{2g} - h_{thd} - \frac{V_{nom}^2}{2g} - \left(\frac{dH_{Tav}}{dX}\right)X_{av}\right)\left(\frac{(\tan\gamma_{gl})}{\left(\tan\gamma_{gl} - \left(\frac{dH_{Tav}}{dX}\right)\right)}\right)$$

with:
 ygl=the angle of the nominal approach gradient,
 hthd=the nominal height of passage of the airplane at the threshold level,
 Xav=the position of the airplane along the runway axis.
The optimum total height variation law $$\frac{dH_{Tav}}{dX}$$

is roughly equal to $$\frac{(P-D)}{mg},$$

in which D represents an aerodynamic drag corresponding to the aerodynamic drag of the airplane during the flight phase concerned and in which m represents a mass corresponding to the mass of the airplane during the flight phase concerned.

In one exemplary embodiment of the method, the thrust P of the engines is disregarded relative to the aerodynamic drag D of the airplane.

Advantageously, in a subsequent step of the method, the maximum stabilization height $h_{stab}$ is compared to a reference minimum height $h_{ref}$ and an alarm is triggered when the maximum stabilization height $h_{stab}$ is less than said reference minimum height $h_{ref}$.

The disclosed embodiments also relate to a piloting aid device, wherein it comprises:
 means of acquiring parameters characteristic of an airplane, of the flight and of a landing environment,
 calculation means, which determine, in particular from the parameters received from the acquisition means, a maximum stabilization height $h_{stab}$,
 means of presenting information characterizing the maximum stabilization height $h_{stab}$.

The calculation means comprise at least one computer handling functions other than determining the maximum stabilization height $h_{stab}$.

Preferably, the information presentation means comprise means of displaying information representative of the stabilization height $h_{stab}$ calculated by the calculation means. For example, said display means comprise at least one screen in a cockpit of the airplane able to present information representative of the stabilization height $h_{stab}$ in graphic form and information characteristic of a reference minimum height $h_{ref}$.

The information presentation means also comprise alarm means able to present an alarm signal when said stabilization height $h_{stab}$ is less than said reference minimum height $h_{ref}$.

In one embodiment, the alarm means generate a sound signal or a visual signal in the cockpit of the airplane.

Preferably, the value of the stabilization height $h_{stab}$ obtained from the device is established according to the method.

BRIEF DESCRIPTION OF THE DRAWINGS

The detailed description of the disclosed embodiments is given with reference to the figures which represent.

DETAILED DESCRIPTION

The method according to the disclosed embodiments consists in supplying the flight crew of an airplane with information enabling them to determine, at any moment, a maximum stabilization height, called $h_{stab}$, for which the airplane is able to be stabilized on a nominal approach path. A stabilized approach corresponds, according to the procedures defined by the flight rules, to a path in which the airplane is positioned on the nominal path with a speed of the airplane equal to a nominal approach speed and with a thrust of the airplane equal to the balance thrust on the approach plane in a landing configuration of the airplane.

According to one application of the method, said maximum stabilization height $h_{stab}$ is then communicated to the crew of the airplane, and preferably compared to a regulatory height recommended by procedures, called reference height $h_{ref}$, for which the approach must be stabilized.

In the runway approach phase, the airplane is supposed to follow a nominal path. Such a nominal path is expressed, for example, in the form of a function $h_{nom}(X)$, representing the nominal height according to a parameter X, associated with a nominal approach speed law, given by a function $V_{nom}(X)$ which can be expressed as inertial speed or aerodynamic speed.

By convention, the value X corresponds to an abscissa measured on a horizontal axis roughly corresponding to an axis of the runway and having an origin arbitrarily set, for example, at the runway threshold and positively oriented in the planned landing direction. According to this choice, the value X is negative before the runway threshold, zero at the runway threshold and positive beyond the runway threshold.

An airplane that is on the nominal path at the height $h_{nom}(X)$ and at the speed $V_{nom}(X)$, that is, at a point in space located on the path and with a nominal speed, has a total energy $E_{Tnom}(X)$ defined as the sum of its kinetic energy $E_c(X) = \frac{1}{2} m V^2_{nom}(X)$ and its potential energy $E_p(X) = mgh_{nom}(X)$, m being the mass of the airplane at the moment of the approach phase. g is the acceleration of the Earth's gravity field.

Let:

$$E_{Tnom}(X) = m\left(gh_{nom}(X) + \frac{(V^2_{nom}(X))}{2}\right)$$

An equivalent expression, consistent with a height, is obtained by dividing the nominal total energy of the airplane by the term mg to express a parameter $H_{Tnom}$, called total height along the nominal path. Let:

$$H_{Tnom}(X) = \frac{(E_{Tnom}(X))}{mg} = h_{nom}(X) + \frac{(V^2_{nom}(X))}{2g}$$

In practice, the airplane in approach at a distance $X_{av}$ has an actual height $h_{av}$ and a speed $V_{av}$ which do not necessarily correspond with those of the nominal path. The crew, in an approach, tries to correct the deviations between its real position and the nominal path. A current total height $H_{Tav}$ of the airplane is expressed:

$$H_{Tav} = h_{av} + \frac{V^2_{av}}{2g}$$

The airplane, the height $h_{av}$ and the speed $V_{av}$ of which can be modified by the piloting of said airplane, is therefore able to modify its total height $H_{Tav}$ during the flight according to the variations limited by the operational constraints and the physical capabilities of the airplane. This ability to modify its total height $H_{Tav}$ according to the distance X traveled given the flight speed $V_{av}$, is expressed by a term $$\frac{dH_{Tav}}{dX}.$$

In the following detailed example, the method is described in an application corresponding to the case where the total height $H_{Tav}$ of the airplane is too high, given its position according to X relative to the nominal path. This choice is not, however, limiting, and the method can also be applied to the case where the airplane presents a total height that is too low, although in this case it is of lesser operational interest.

When the airplane is, relative to the runway threshold, at an abscissa X with a total height $H_{Tav}$ different from the nominal total height $H_{Tnom}(X)$, the method according to the disclosed embodiments consists in calculating a maximum stabilization height value $h_{stab}$ for which the total height of the airplane $H_{Tav}$ would reach a nominal stabilized value $H_{Tnom}$ in the case where the airplane would modify its total height according to a minimum law $$\frac{dH_{Tav}}{dX}.$$

Figure 1:
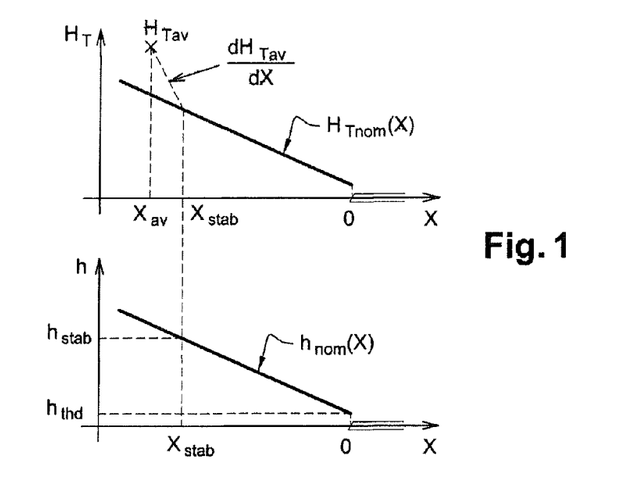
FIG. 1, two diagrams illustrating how to geometrically obtain a maximum stabilization height according to the disclosed embodiments,
 FIG. 2, a schematic diagram of the device according to the disclosed embodiments,
 FIG. 3, an exemplary screen display comprising the stabilization height calculated by the disclosed embodiments.

In the exemplary implementation of the method, a value $X_{stab}$ satisfying the same condition is determined initially, then the maximum stabilization height $h_{stab}$ is determined as the height $h_{nom}(X)$ of the nominal path for $X=X_{stab}$, as illustrated in FIG. 1.

$h_{stab}$ correctly corresponds to a maximum height on the nominal path (descending:

$$\frac{dh_{nom}}{dX} < 0)$$

in as much as the minimum term $$\frac{dH_{Tav}}{dX}$$

used in the case of an excess total height of the airplane causes the value $X_{stab}$ to be minimized.

In a first step of the method, the value $X_{stab}$ is calculated.

In a first phase of the first step of the method, the nominal function $h_{nom}(X)$ is determined from the particular conditions of the terrain, such as, for example, the altitude or the associated descent gradient (glide gradient), and from the particular conditions of the airplane, in particular its mass m and its approach configuration (leading edge and flap positions) which determines the nominal approach speed according to the flight manual.

In a second phase of the first step, the function expressing the total nominal height $H_{Tnom}(X)$ is determined from the relation $$H_{Tnom}(X) = h_{nom}(X) + \frac{(V^2_{nom}(X))}{2g}$$

In a third phase of the first step, the maximum capabilities of the airplane to vary its total height, and therefore to converge towards the nominal total height, are determined and expressed by the function $$\frac{dH_{Tav}}{dX},$$

in particular minimum $$\frac{dH_{Tav}}{dX}$$

when, at the point concerned, the total height of the airplane is greater than the desired nominal total height.

In a fourth phase of the first step, the value $X_{stab}$ is determined as being the value of X for which the total height of the airplane that would vary its total height according to the total height variation law $$\frac{dH_{Tav}}{dX}$$

from its current position $X_{av}$ would become equal to the nominal total height $H_{Tnom}(X_{stab})$.

This amounts to considering that the value $X_{stab}$ is obtained by the intersection in a plane (X, total height) of the minimum total height curve with the total height curve of the path that the airplane would follow by applying flight parameters of the airplane to reduce the total height of the airplane as rapidly as possible (when the airplane is at a total height that is too high).

Thus, at any flight point in the approach phase, the value $X_{stab}$ is defined by a relation $$H_{Tnom}(X_{stab}) = H_{Tav} + \int_{(X_{av})}^{(X_{stab})} \left( \frac{dH_{Tav}}{dX} \right)$$

In a second step of the method, according to this value $X_{stab}$, the value $h_{stab}$ is determined by the corresponding height on the nominal path $h_{nom}(X)$, namely $h_{stab}=h_{nom}(X_{stab})$.

Advantageously, the preceding expressions used for determining the maximum stabilization height $h_{stab}$ are general and take account in particular:

of a thrust P of the engines, and of its variations, in particular according to the height,
of the wind,
of the wind gradient in space and time,
of an aerodynamic drag D and its variations.

Furthermore, the variation of the energy of the airplane $dE_{av}$ along the path following a curvilinear abscissa x depends on the resultant of the forces being exerted on the airplane along the path, that is, the difference between the thrust P of the engines and the drag D of the airplane, and is expressed:

$$dE_{av}=(P-D)dx$$

the thrust P being, in flight, positive in the direction of movement of the airplane and the drag D being opposite by definition to the direction of movement but the term D being expressed here as an absolute value.

Furthermore, the projection of the path of the airplane on the axis X leads to the relation between X and x: $X=x \cos(\gamma_{av})$ in which $\gamma_{av}$ is the slope of the path of the airplane.

In practice, the flight gradients of civilian airplanes, above all in the approach phases, are low, of the order of a few degrees. In an approach, an airplane normally does not exceed a gradient twice the glide gradient $\gamma_{gi}$, typically 3° for a standard glide gradient.

Advantageously, these low values make it possible, for the needs of the present application, to disregard the term in $\cos(\gamma_{av})$ and for the rest of the exemplary implementation of the method, it will be considered that $\cos(\gamma_{av}) \approx 1$ and therefore that $$dE_{av}=(P-D)dX$$

This energy variation according to the abscissa X can also be expressed in the form of a total height variation $$\frac{dE_{av}}{mg} = dH_{Tav} = dX \frac{(P-D)}{mg}$$

because the mass m of the airplane can be considered constant during the approach. Said mass is in effect modified only by the fuel consumption, a consumption that is negligible relative to the mass m of the airplane over the time interval concerned.

The total height variation law of the airplane according to the distance X traveled is then expressed at any instant by:

$$\frac{dH_{Tav}}{dX} = \frac{(P-D)}{mg}$$

To determine the capacity of the airplane to reduce its total height, the value $$\frac{dH_{Tav}}{dX}$$

must be minimized and the difference between the thrust P and the drag D must be minimized.

Advantageously, during the approach phase, the thrust P and the drag D can each be approximated by a constant.

According to the method, in one exemplary implementation, the thrust P of the engines is reduced to the minimum that is possible and, in an additional approximation, the value of the residual thrust is disregarded relative to the aerodynamic drag of the airplane.

In another exemplary implementation, when the airplane is able to increase its drag, for example by means of air brakes, the drag D of the airplane is also increased to the acceptable maximum.

In the example of the illustrations of FIG. 1, during the approach phase, the approach speed is considered roughly constant. Thus, the total height $H_{Tnom}(X)$ curve is represented by a straight line, parallel to the nominal height $h_{nom}(X)$ curve and offset by a constant value $$\frac{V_{nom}^2}{2g}.$$

Similarly, the minimum value $$\frac{dH_{tav}}{dX}$$

is considered roughly constant during the approach phase.

By applying these simplifying assumptions, which are legitimate in many cases, the maximum stabilization height $h_{stab}$ for which the approach phase is stabilized is obtained by applying the formula:

$$h_{stab} = h_{thd} + \left(h_{av} + \frac{V_{av}^2}{2g} - h_{thd} - \frac{V_{nom}^2}{2g} - \left(\frac{dH_{Tav}}{dX}\right)X_{av}\right)\left(\frac{(\tan\gamma_{gl})}{\left(\tan\gamma_{gl} - \left(\frac{dH_{Tav}}{dX}\right)\right)}\right)$$

with:
$\gamma_{gi}$=the angle of the nominal approach gradient,
$h_{thd}$=the nominal height of passage of the airplane at the threshold level, $\frac{dH_{Tav}}{dX}$ = the capacity of the airplane to modify its total height according to the distance $X$ traveled, $V_{av}$=the speed of the airplane,
$X_{av}$=the position of the airplane along the runway axis,
$V_{nom}$=the nominal speed of the approach phase,
$h_{av}$=the height of the airplane relative to the runway threshold.

Certain values, such as, for example, that of $\gamma_{gi}$, $h_{thd}$, $V_{nom}$ depend on the runway ($\gamma_{gi}$, $h_{thd}$) and/or the airplane ($V_{nom}$). Typically, $\gamma_{gi}$ is of the order of $-3$, $h_{thd}$ is of the order of 50 feet (~15 m) and $V_{nom}$ is of the order of 140 kt (~70 m/s).

In a subsequent step of the method, the value $h_{stab}$ is compared to a reference height $h_{ref}$ defined by the approach procedures.

Advantageously, when the calculated maximum stabilization height $h_{stab}$ is situated below the reference minimum height $h_{ref}$, that is, the flight parameters of the airplane will not be able to reach the nominal values before the airplane is at the reference minimum height $h_{ref}$ and, consequently, the procedures cannot be observed, a visual or sound alarm is generated for the attention of the crew.

Figure 2:
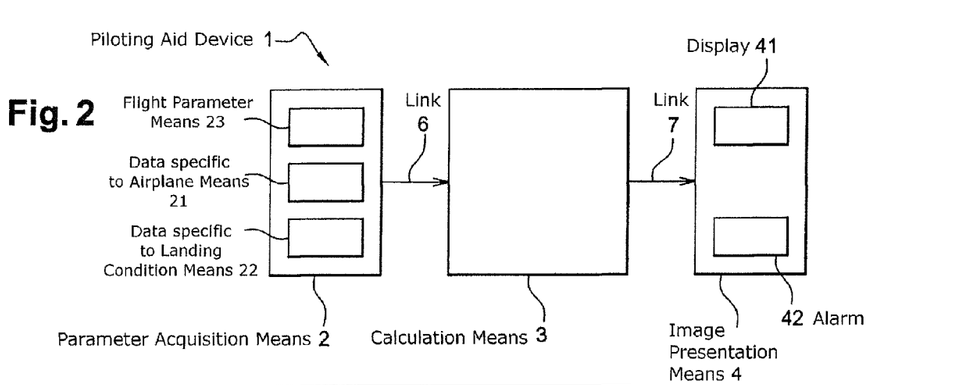

In one exemplary implementation of the method, a piloting aid device 1 comprises, as illustrated in FIG. 2:
parameter acquisition means 2 that are conventional on board an airplane which, in particular, generate and/or acquire the values of the parameters necessary to the method of determining the stabilization height $h_{stab}$,
calculation means 3, linked by a link 6 to the parameter acquisition means 2, and which determine, using the various information received from said parameter acquisition means, the maximum stabilization height $h_{stab}$ corresponding to an estimation of the height of the airplane for which the approach is able to be stabilized, given the position and current flight parameters of the airplane,
information presentation means 4, which are linked by a link 7 to the calculation means 3.

The parameter acquisition means 2 comprise at least:
means 21 comprising data specific to the airplane, such as an airplane database, enabling it to calculate the specific values of the airplane, such as its mass or its drag.
In practice, the means 21 do not necessarily have a database that is specific to them but are able to query an existing database in other systems, for example a flight management system (FMS) which is able to transmit raw information or information drawn up from measured parameters.
means 22 comprising data specific to the landing conditions such as, for example, the characteristics of the runway, for example the altitude and angle of the glide descent plane. In this case, as for the airplane data, the means 22 are, as appropriate, able to query other systems of the airplane to obtain this data.
means 23 of acquiring flight parameters of the airplane, such as, for example, the height, the speed, the force and direction of the wind, which are information that is generally accessible on board a modern airplane over communication buses in the form of raw or detailed values (filtered, hybridized, etc.).

The calculation means 3 comprise at least one computer, advantageously a computer of the airplane handling other functions, able to calculate the stabilization height $h_{stab}$ according to the capacity of the airplane to modify its total height $$\frac{dH_{Tav}}{dX}$$

determined from parameters obtained by the parameter acquisition means 2.

The information presentation means 4 comprise, for example, display means 41, for example using a navigation screen already present in the cockpit, which present the calculated maximum stabilization height $h_{stab}$ and the reference height $h_{ref}$ specified by the procedures.

Figure 3:
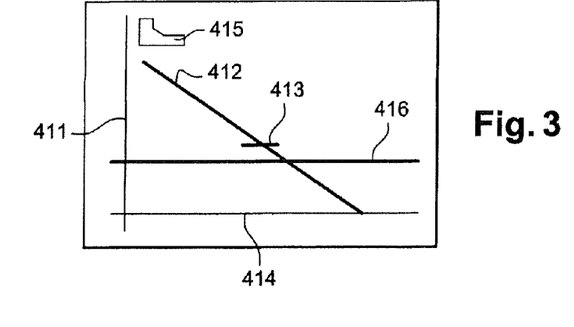

As an example, FIG. 3 illustrates a screen display which represents, in a vertical plane, the path of the airplane.

In this vertical plane:
a vertical scale 411 represents the height relative to the runway threshold 414, taken as an ordinate reference,
a line 412 diagrammatically represents the nominal path $h_{nom}(X)$,
a marker 416 represents the minimum stabilization height specified by the procedures $h_{ref}$,
a marker 413 represents the maximum stabilization height $h_{stab}$ of the airplane generated by the calculation means 3, in the form, for example, of a horizontal segment,
a symbol 415 represents the position of the airplane in the vertical plane.

In a preferred operation of the device, during the approach phase, said maximum stabilization height $h_{stab}$ is permanently displayed according to the current position of the airplane. The pilot can thus position himself relative to the heights given by the procedures and rapidly observe a change in this stabilization height $h_{stab}$ if he does not apply the necessary corrective measures to make the airplane converge towards the nominal path with the parameters used to calculate the value of the stabilization height $h_{stab}$.

In particular, if the $h_{stab}$ marker 413 on the display falls below the height $h_{ref}$ 416, the pilot is informed that, even if he is still backward on the approach path, above or below the reference height $h_{ref}$, it will be impossible for him to stabilize the flight parameters before reaching a height equal to $h_{ref}$ and that, in this case, he will have to perform a go-around, which can consequently be anticipated and better prepared for the safety of the flight.

Furthermore, the means 4 comprise alarm means 42 which are able to output an alarm signal in the cockpit, in the case where the stabilization height $h_{stab}$ becomes less than the reference height $h_{ref}$. For example, an alarm signal is triggered when the maximum stabilization height $h_{stab}$ is less than the reference height $h_{ref}$ given by the procedures or, if margins are desirable, less than $h_{ref}+\Delta h_{ref}$. $\Delta h_{ref}$ is advantageously determined according to uncertainties on the determination of the stabilization height $h_{stab}$, uncertainties that can be intrinsic to the device 1, because, in particular, of the simplifying assumptions of the calculations, or extrinsic, for example because of the lack of knowledge of an external parameter that can influence the value of the stabilization height $h_{stab}$, such as a wind gradient with the altitude.

The alarm means 42 output, for example, a sound signal, which is output, for example, by a loudspeaker in the cockpit, and/or a visual signal on an alarm indicator or on a display screen, in particular an alarm message, signifying "go-around recommended" or "approach not stabilized", and/or a change of color or of shape of the symbol 413.

The method and the device according to the disclosed embodiments thus make it possible to anticipate the knowledge of a situation in which the pilot will not be able to continue his landing in accordance with the procedures and thus enable him to prepare a go-around, probably inevitable for safety reasons.

The invention claimed is:

1. Method of determining and utilizing a maximum stabilization height $h_{stab}$ of an airplane moving from a current position, at a height $h_{av}$ relative to a reference point and with a speed $V_{av}$ in a final flight phase of said airplane, said final flight phase comprising a nominal approach path roughly in a vertical plane passing through an axis X of a runway and determined by:
    nominal height values according to the position along the axis X called height law $h_{nom}(X)$ relative to the reference point;
    nominal approach speed values according to the position along the axis X called speed law $V_{nom}(X)$;
    wherein the method comprises configuring a computer to:
        determine a nominal total height $H_{Tnom}$ at any point of the nominal path by the relation $$H_{Tnom}(X) = h_{nom}(X) + \frac{(V_{nom}^2(X))}{2g}$$

in which g represents the earth's gravity field;
        determine a total height of the airplane $H_{Tav}$ by the relation $$H_{Tav} = h_{av} + \frac{V_{av}^2}{2g}$$

determine a nominal maximum total height that the airplane is able to reach from its current position corresponding to a nominal total height and according to an optimum total height variation law $$\frac{dH_{Tav}}{dX};$$

and
        determine the maximum stabilization height $h_{stab}$ corresponding to the nominal maximum total height that the airplane is able to reach; the method further comprising determining whether to continue or to interrupt a landing procedure during the final flight phase of the airplane based on the determined maximum stabilization height.

2. Method according to claim 1 in which, when the total height of the airplane $H_{Tav}$ is greater than the nominal total height $H_{Tnom}(X)$ for the current value X of the airplane, the optimum total height variation law $$\frac{dH_{Tav}}{dX}$$

corresponds to the total height variation law of the airplane when the engines are set to obtain a thrust P roughly equal to the minimum thrust at the flight point concerned.

3. Method according to claim 1, in which the nominal approach speed $V_{nom}(X)$ is considered constant in the final flight phase.

4. Method according to claim 3, in which the optimum total height variation law $$\frac{dH_{Tav}}{dX}$$

is considered constant in the final flight phase.

5. Method according to claim 4, in which the stabilization height $h_{stab}$ is determined by a relation:

$$h_{stab} = h_{thd} + \left(h_{av} + \frac{V_{av}^2}{2g} - h_{thd} - \frac{V_{nom}^2}{2g} - \left(\frac{dH_{Tav}}{dX}\right)X_{av}\right)\left(\frac{(\tan\gamma_{gl})}{\left(\tan\gamma_{gl} - \left(\frac{dH_{Tav}}{dX}\right)\right)}\right)$$

with:
    $\gamma_{gl}$=the angle of the nominal approach gradient,
    $h_{thd}$=the nominal height of passage of the airplane at the threshold level,
    $X_{av}$=the position of the airplane along the runway axis.

6. Method according to claim 1, in which the optimum total height variation law $$\frac{dH_{Tav}}{dX}$$

is roughly equal to $$\frac{(P-D)}{mg},$$

in which D represents an aerodynamic drag corresponding to the aerodynamic drag of the airplane during the flight phase concerned and in which m represents a mass corresponding to the mass of the airplane during the flight phase concerned.

7. Method according to claim 6, in which the thrust P of the engines is disregarded relative to the aerodynamic drag D of the airplane.

8. Method according to claim 1, comprising a subsequent step in which the maximum stabilization height $h_{stab}$ is compared to a reference minimum height $h_{ref}$.

9. Method according to claim 8, in which an alarm is triggered when the maximum stabilization height $h_{stab}$ is less than the reference minimum height $h_{ref}$.

10. Piloting aid device, comprising:
    means of acquiring parameters characteristic of an airplane, of the flight and of a landing environment including nominal height values according to the position along the axis X called height law $h_{nom}(X)$ relative to the reference point, and nominal approach speed values according to the position along the axis X called speed law $V_{nom}(X)$,
    calculation means, which determine, from values including the parameters received from the acquisition means, a maximum stabilization height $h_{stab}$, by:
        determining a nominal total height $H_{Tnom}$ at any point of the nominal path by the relation $$H_{Tnom}(X) = h_{nom}(X) + \frac{(V_{nom}^2(X))}{2g}$$

in which g represents the earth's gravity field;
    determining a total height of the airplane $H_{Tav}$ by the relation $$H_{Tav} = h_{av} + \frac{V_{av}^2}{2g}$$

determining a nominal maximum total height that the airplane is able to reach from its current position corresponding to a nominal total height and according to an optimum total height variation law $$\frac{dH_{Tav}}{dX};$$

and
    determining the maximum stabilization height $h_{stab}$ corresponding to the nominal maximum total height that the airplane is able to reach;
    means of presenting information characterizing the maximum stabilization height $h_{stab}$; and
    means for determining whether to continue or to interrupt a landing procedure during the final flight phase of the airplane based on the determined maximum stabilization height.

11. Device according to claim 10, in which the calculation means comprise at least one computer handling functions other than determining the maximum stabilization height $h_{stab}$.

12. Device according to claim 10, in which the information presentation means comprise means of displaying information representative of the stabilization height $h_{stab}$ calculated by the calculation means.

13. Device according to claim 12, in which the display means comprise at least one screen in a cockpit of the airplane able to present information representative of the stabilization height $h_{stab}$ in graphic form.

14. Device according to claim 12, in which the display means present information characteristic of a reference minimum height $h_{ref}$.

15. Device according to claim 10, in which the information presentation means comprise alarm means able to present an alarm signal when the stabilization height $h_{stab}$ is less than the reference minimum height $h_{ref}$.

16. Device according to claim 15, in which the alarm means generate a sound signal in the cockpit of the airplane.

17. Device according to claim 15, in which the alarm means generate a visual signal in the cockpit of the airplane.

18. A piloting aid device comprising:
    means of acquiring parameters characteristic of an airplane, of the flight and of a landing environment,
    calculation means, which determine, from values including the parameters received from the acquisition means, a maximum stabilization height $h_{stab}$,
    means of presenting information characterizing the maximum stabilization height $h_{stab}$,
    and in which the value of the stabilization height $h_{stab}$ is established according to the method of claim 1.

19. Airplane including a device, comprising:
    means of acquiring parameters characteristic of an airplane, of the flight and of a landing environment including nominal height values according to the position along the axis X called height law $h_{nom}(X)$ relative to the reference point, and nominal approach speed values according to the position along the axis X called speed law $V_{nom}(X)$,
    calculation means, which determine, from values including the parameters received from the acquisition means, a maximum stabilization height $h_{stab}$, by:
        determining a nominal total height $H_{Tnom}$ at any point of the nominal path by the relation $$H_{Tnom}(X) = h_{nom}(X) + \frac{(V_{nom}^2(X))}{2g}$$

in which g represents the earth's gravity field;
    determining a total height of the airplane $H_{Tav}$ by the relation $$H_{Tav} = h_{av} + \frac{V_{av}^2}{2g}$$

determining a nominal maximum total height that the airplane is able to reach from its current position corresponding to a nominal total height and according to an optimum total height variation law $$\frac{dH_{Tav}}{dX};$$

and
    determining the maximum stabilization height $h_{stab}$ corresponding to the nominal maximum total height that the airplane is able to reach;

means of presenting information characterizing the maximum stabilization height $h_{stab}$; and means for determining whether to continue or to interrupt a landing procedure during the final flight phase of the airplane based on the determined maximum stabilization height.

20. Airplane in which a maximum stabilization height $h_{stab}$ is established according to a method of determining and utilizing a maximum stabilization height $h_{stab}$ of the airplane when moving from a current position, at a height $h_{av}$ relative to a reference point and with a speed $V_{av}$ in a final flight phase of said airplane, said final flight phase comprising a nominal approach path roughly in a vertical plane passing through an axis X of a runway and determined by:

nominal height values according to the position along the axis X called height law $h_{nom}(X)$ relative to the reference point;

nominal approach speed values according to the position along the axis X called speed law $V_{nom}(X)$;

wherein the method comprises configuring a computer to:
determine a nominal total height $H_{Tnom}$ at any point of the nominal path by the relation $$H_{Tnom}(X) = h_{nom}(X) + \frac{(V_{nom}^2(X))}{2g}$$

in which g represents the earth's gravity field;

determine a total height of the airplane $H_{Tav}$ by the relation $$H_{Tav} = h_{av} + \frac{V_{av}^2}{2g}$$

determine a nominal maximum total height that the airplane is able to reach from its current position corresponding to a nominal total height and according to an optimum total height variation law $$\frac{dH_{Tav}}{dX};$$

and determine the maximum stabilization height $h_{stab}$ corresponding to the nominal maximum total height that the airplane is able to reach;

the method further comprising determining whether to continue or to interrupt a landing procedure during the final flight phase of the airplane based on the determined maximum stabilization height.

\* \* \* \* \*

UNITED STATES PATENT AND TRADEMARK OFFICE
CERTIFICATE OF CORRECTION

PATENT NO. : 8,224,506 B2  Page 1 of 1
APPLICATION NO. : 12/021252
DATED : July 17, 2012
INVENTOR(S) : Florian Constans It is certified that error appears in the above-identified patent and that said Letters Patent is hereby corrected as shown below:

Column 12, line 48, Claim 5, delete "Ygi" and insert -- Ygl --, therefor.

Signed and Sealed this
Fourth Day of September, 2012

David J. Kappos
*Director of the United States Patent and Trademark Office*